United States Patent

Ichioka et al.

[11] Patent Number: 5,941,329
[45] Date of Patent: Aug. 24, 1999

[54] RADIATOR GRILL GUARD FOR A VEHICLE

[75] Inventors: Tetsumi Ichioka, Mie; Takuji Nagata, Aichi, both of Japan; Akira Yamauchi, West Bloomfield, Mich.

[73] Assignee: Toyoda Gosei Co., Ltd., Nishikasugai-gun, Japan

[21] Appl. No.: 08/827,002

[22] Filed: Mar. 25, 1997

[30] Foreign Application Priority Data

Mar. 25, 1996 [JP] Japan .................................. 8-068467

[51] Int. Cl.$^6$ .................................................. B60K 11/04
[52] U.S. Cl. ........................................ 180/68.6; 293/115
[58] Field of Search ................................. 293/115, 132; 296/194, 901; 180/68.6; 123/40.1; 165/98; 237/79

[56] References Cited

U.S. PATENT DOCUMENTS 5,141,282  8/1992  Fujiwara ............................... 2296/194
5,478,127 12/1995  Chase ..................................... 293/115

*Primary Examiner*—Robert J. Oberleitner
*Assistant Examiner*—C. T. Bartz
*Attorney, Agent, or Firm*—Pillsbury Madison & Sutro LLP

[57] ABSTRACT

In a radiator grill guard mounted on the front of a vehicle, a guard main body is a one-piece molded structure, shaped like a square ring, by using synthetic resin, for example, filler containing polypropylene. The guard main body is hollowed by a known blow molding method. A fog-lamp mounting part is provided at the middle of each of the vertically extending sections of the guard main body. A fog lamp is mounted on each fog-lamp mounting part with the aid of an L-shaped bracket. A plurality of, preferable two, plate-like ribs, that extend parallel to each other, are integrally formed within the inner apace of each vertically extending section, while also extending across that inner space. The plurality of plate-like ribs are longitudinally (vertically) extended between the upper and lower body mounting parts of each of the vertically extending sections. The plate-like ribs serve as reinforcing plates for reinforcing a portion of the vertically extending sections which include the body mounting parts and the fog-lamp mounting part.

14 Claims, 5 Drawing Sheets

RADIATOR GRILL GUARD FOR A VEHICLE

BACKGROUND OF THE INVENTION

1. Field of the Invention

The present invention relates to a radiator grill guard for a vehicle which is mounted on the front of a vehicle for enhancing the external appearance of the vehicle.

2. Description of the Related Art

A four-wheel drive car having an accessory, called a radiator grill guard, attached to the front of the car body is known. The radiator grill guard is disposed in a state that it somewhat protrudes outwardly toward the front, and is bent at a plurality of locations thereof when externally viewed. Generally, this type of radiator grill guard is attached to the vehicle in order to present good external appearance of the vehicle. Recently, there has been a proposal to construct radiator grill guards from resin. The resin grill guard is usually a hollowed structure formed by using blow molding techniques.

In recent grill guards, fog lamps are directly mounted on the radiator grill guard. Those grill guards have the following problem in the conventional hollowed grill guard formed by a blow molding, deformation, e.g., deflection or twist, is readily caused in the fog-lamp mounted portions of the radiator grill guard mainly by the load of the fog lamps. To cope with this, it is necessary to reinforce the radiator grill guard per se in some way.

SUMMARY OF THE INVENTION

To solve the above problem, the present invention has been made and has an object to increase the rigidity of a radiator grill guard for a vehicle made of resin.

According to a first aspect of the invention, there is provided a radiator grill guard for a vehicle comprised of a hollowed main body formed by blow molding resin material. A plate-like rib is integrally molded within an inner space of the main body and is located near to or adjacent a body mounting part of the main body while traversing the inner space of the main body. Subsequently, the vehicle grill is mounted on a body of a vehicle via the body mounting part.

According to a second aspect of the invention, there is provided a radiator grill guard for a vehicle, on which a fog lamp is mounted, in the form of a hollowed main body formed by blow molding resin material. A plate-like rib is integrally molded within an inner space of the main body: wherein the plate-like rib is located near to a fog-lamp mounting part for the fog lamp while traversing the inner space of the main body.

As described above, the present invention usefully increases the rigidity of the radiator grill guard for a vehicle made of resin.

DETAILED DESCRIPTION OF THE PREFERRED EMBODIMENTS

Embodiments of the present invention will be described with reference to the accompanying drawings.

Figure 1:
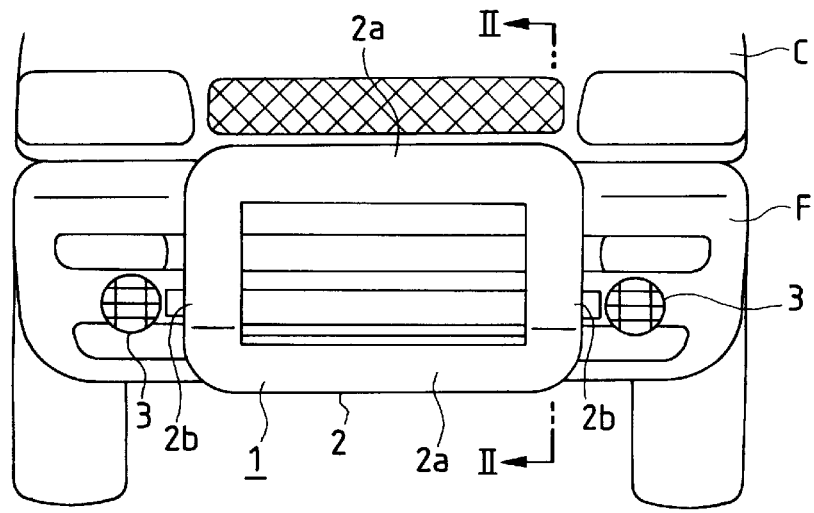
FIG. 1 is a front view of a radiator grill guard for a vehicle according to an embodiment of the present invention, the radiator grill guard being attached to the front of a vehicle.

In FIG. 1, a radiator grill guard 1 includes a guard main body 2 which serves as a primary structure, the front part of which serves as a design surface. The guard main body 2 is disposed in front of the front bumper F of a vehicle C. The guard main body 2 is one-piece molded structure, shaped like a square ring, by using synthetic resin, for example, filler contained polypropylene. The guard main body 2 is hollowed by a known blow molding method. In the description to follow, the horizontally or laterally extending, upper and lower sections of the guard main body 2 will be referred to as horizontal sections 2a, and the vertically extending, right and left sections thereof will be referred to as vertical sections 2b. Fog lamps 3 are mounted on the vertical sections 2b of the guard main body 2, respectively.

Figure 2:
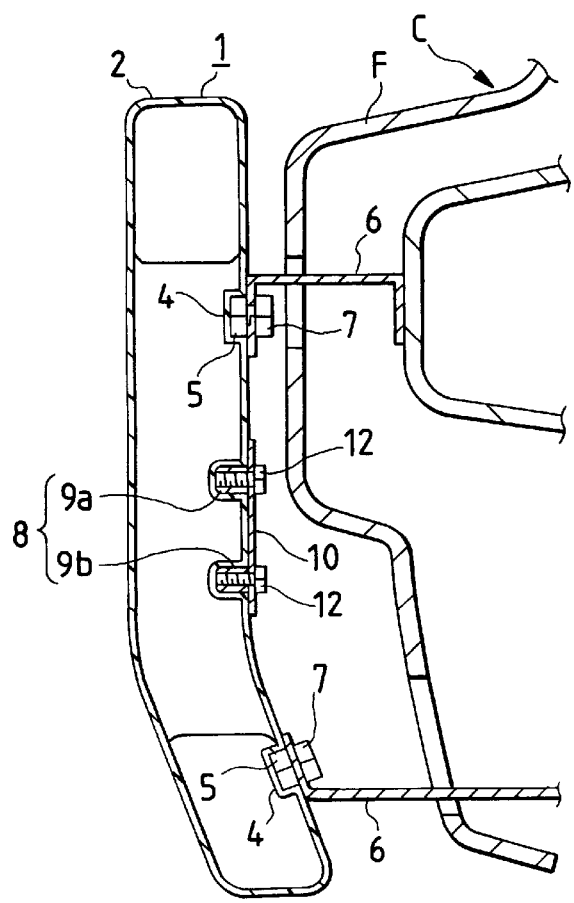
FIG. 2 is a cross sectional view taken along line II—II in FIG. 1.
Figure 3:
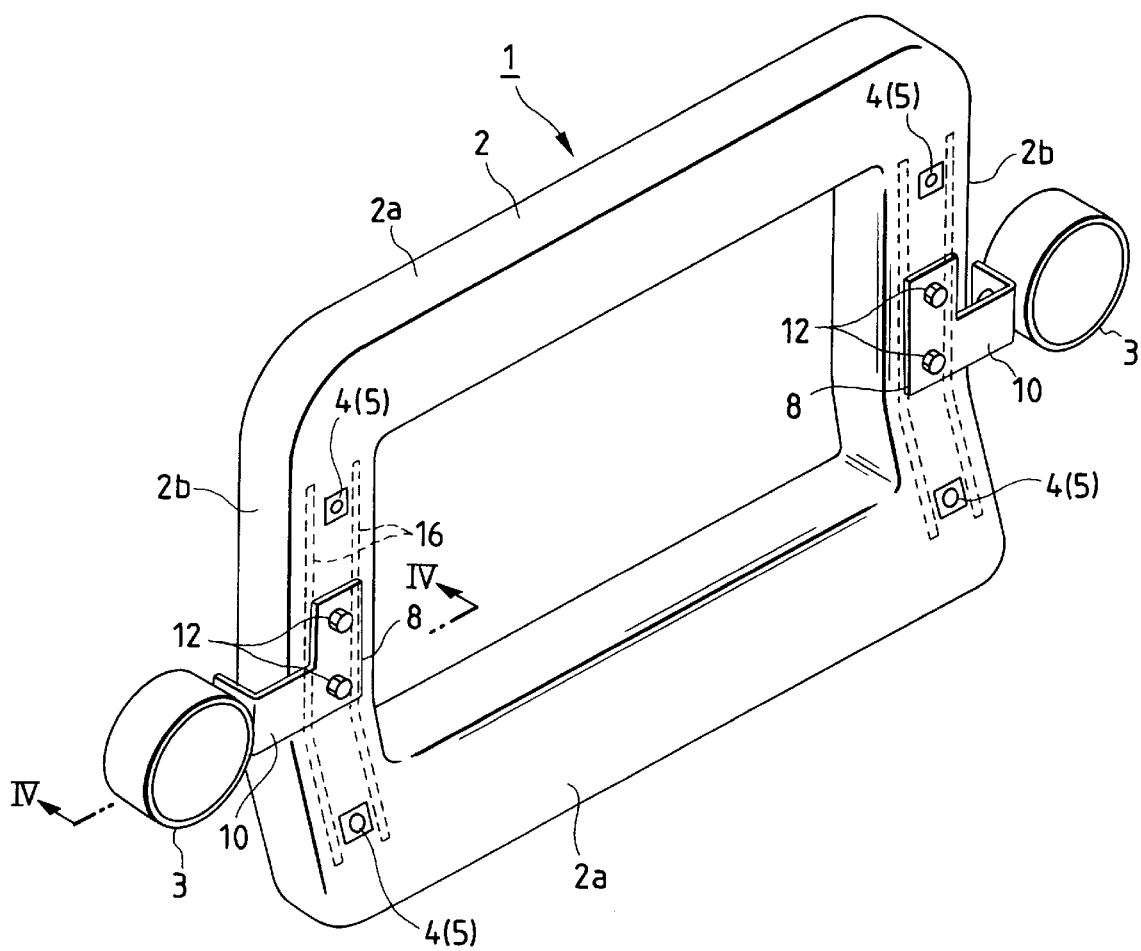
FIG. 3 is a perspective view showing the rear side of the radiator grill guard.

As illustrated in FIGS. 2 and 3, a pair of body mounting parts 4 are vertically arrayed on each of the vertical sections 2b. A body mounting nut 5 is buried in each of the body mounting parts 4. A stay 6, which extends from the vehicle body, is fastened to each of the body mounting parts 4, which include body mounting nuts 5, by means of a bolt 7, whereby the radiator grill guard 1 is fixed to the vehicle C.

A fog-lamp mounting part 8 is provided at the middle of each of the vertical sections 2b. A pair of fog-lamp mounting nuts 9a and 9b are buried in the fog-lamp mounting part 8, while being vertically arrayed. A fog lamp 3 is mounted on each side of the radiator grill guard 1, via fog-lamp mounting parts 8 with the aid of a bracket 10 shaped like L.

Figure 4:
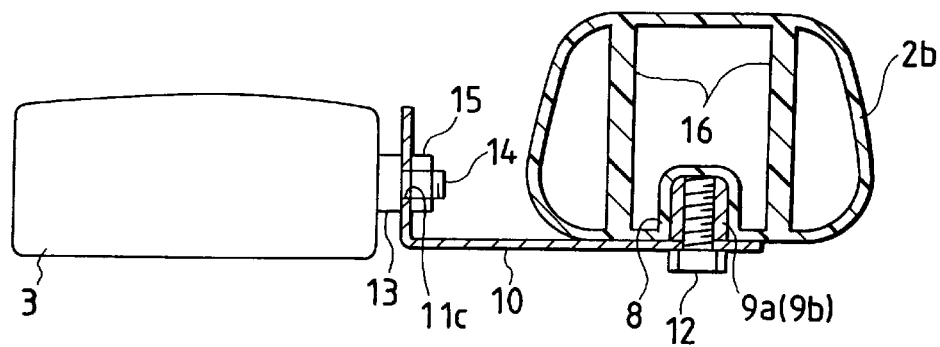
FIG. 4 is a cross sectional view taken along line IV—IV in FIG. 3.
Figure 5:
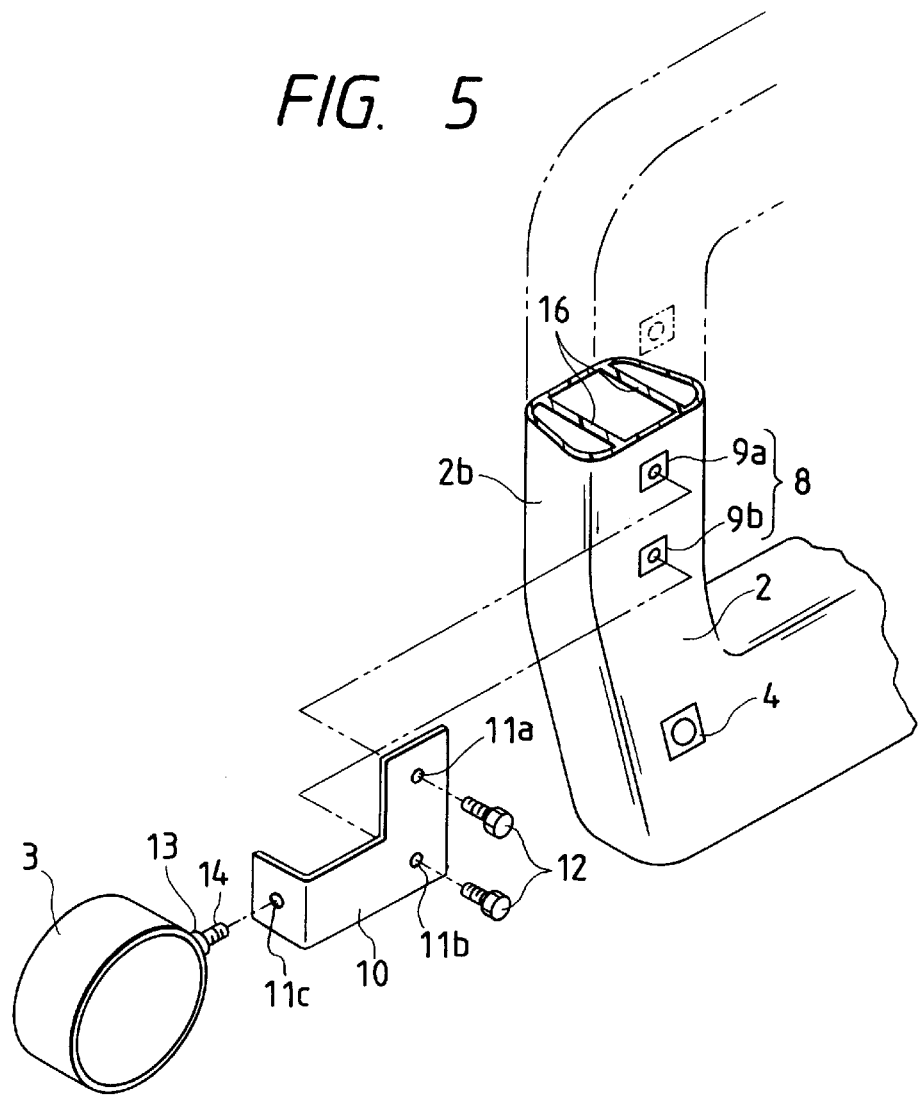
FIG. 5 is an exploded, partially broken, perspective view of a major portion of the radiator grill guard.

As best illustrated in FIG. 5, the bracket 10 includes three through-holes 11a, 11b and 11c formed therein. Of those through-holes, the through-holes 11a and 11b correspond in position to the fog-lamp mounting nuts 9a and 9b. Bolts 12 are screwed into the fog-lamp mounting nuts 9a and 9b, through the through-holes 11a and 11b, whereby the bracket 10 is mounted on the guard main body 2. As shown in FIGS. 4 and 5, a male-screw 14 is protruded from the base 13 of each of the fog lamps 3. The male-screw 14 is screwed into a nut 15 through the through-hole 11c, whereby the fog lamps 3 is mounted on the bracket 10.

A plurality, preferably two, of plate-like ribs 16, that extend parallel to each other, are integrally formed within the inner space of each vertical section 2b, and extend across the inner space. The plate-like ribs 16 extend vertically between the upper and lower body mounting parts 4 of each of the vertical sections 2b (cf. FIG. 3). The plate-like ribs 16 are arrayed such that the upper and lower body mounting parts 4 and the fog-lamp mounting part 8 are located between the ribs. The thickness of each of the plate-like ribs 16 is approximately twice as large as that of the outer wall of the vertical section. The plate-like ribs 16 serve as reinforcing plates for reinforcing a portion of the vertical section which includes the body mounting parts 4 and the fog-lamp mounting part 8.

A procedure for molding the ribs 16 formed in the inner space of the hollowed guard main body 2 will be described. A portion of the guard main body 2 is formed by an extrusion or injection molding method. The resultant parison is placed between the upper and lower molds 21 and 22 shown in FIG. 6(a). In this case, the parison is placed in a molding chamber 23. Then, air is blown into the parison. Superfluous material is forcibly put as burr into escaping chambers 24.

Figure 6A:
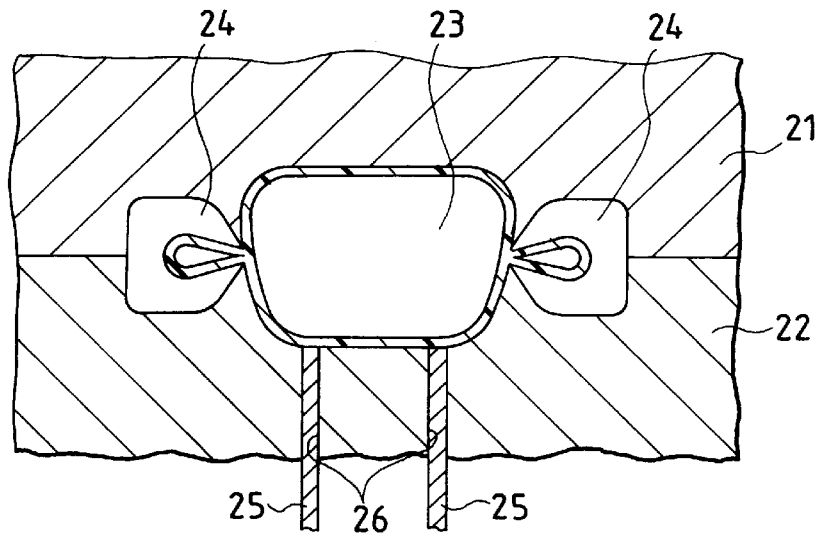
FIGS. 6(a) to 6(c) are sectional views useful in explaining a process for forming a radiator grill guard.
Figure 6B:
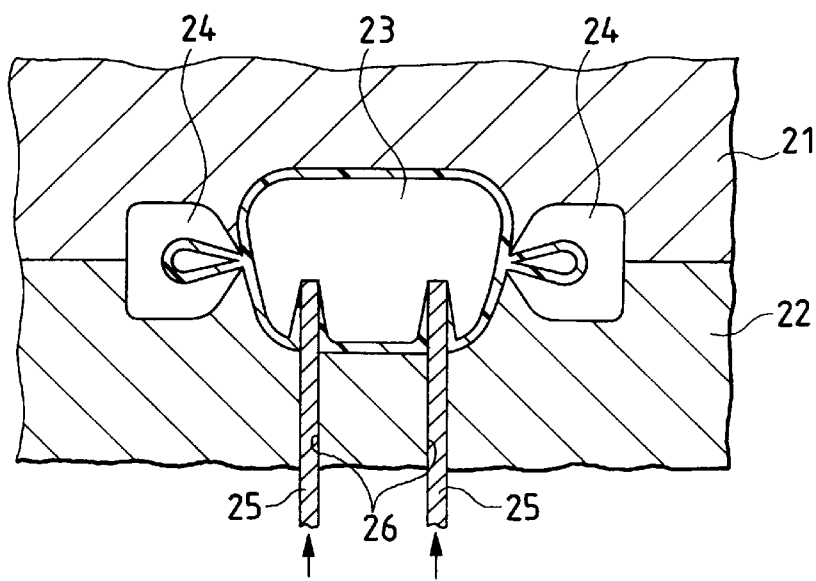
Figure 6C:
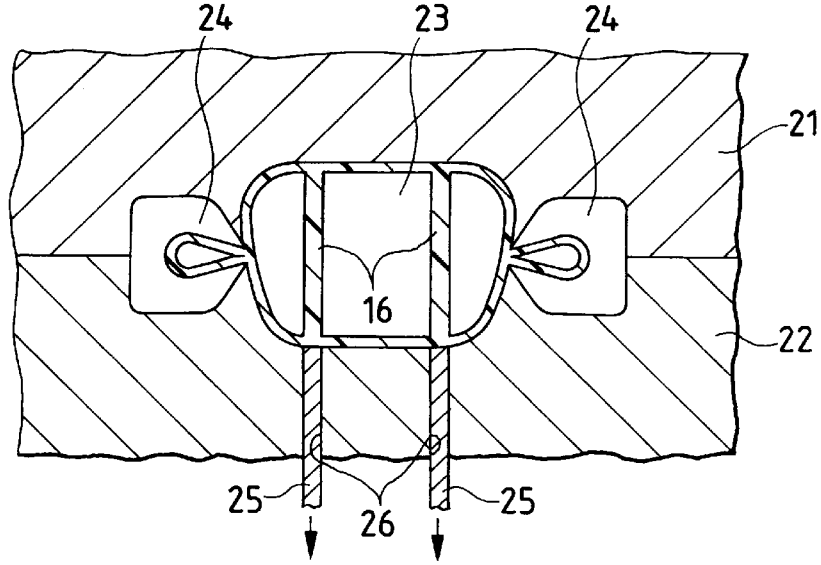

The lower mold 22 is provided with a plate-like piston referred to as a piston plate 25, is vertically movable by an oil pressure mechanism, not shown. In a normal state, the piston plate 25 is placed under the bottom wall (when viewed in the FIGS. 6a–6c) of the guard main body 2 and completely within a slide groove 26, as shown in FIG. 6(a). During the process where air is blown into the parison and the material is solidified, the piston plate 25 is lifted to reach a position near the upper wall of the guard main body 2, as shown in FIG. 6(b). Through the action of the piston plate 25, as shown in FIG. 6(c), ribs 16 are formed between the upper and lower walls of the guard main body 2, as shown in FIG. 6(c).

The useful effects of the radiator grill guard for a vehicle thus constructed will now be described.

(a) Within the inner space of the hollowed guard main body 2 of the radiator grill guard 1, the ribs 16 are formed in a state that the ribs traverse the inner space and longitudinally extend in a region including the body mounting parts 4 and the fog-lamp mounting parts 8. With provision of the ribs 16, the guard main body 2 does not suffer from deformation, e.g., deflection and twisting, caused by the load associated with supporting of the fog lamps 3. As a result, the rigidity of the radiator grill guard 1 is increased. In the embodiment of the invention, the fog lamps 3 are mounted on the vertical sections 2b of the guard main body 2. Accordingly, stress by deflection, twist and the like, produced in the guard main body 2 is large. However, the ribs 16 provided in the vertical sections 2b satisfactorily prevents the guard main body 2 from being deformed.

(b) The guard main body 2 is hollowed by using blow molding techniques. The ribs 16, as reinforcing plates, are formed integrally with the guard main body 2. Therefore, the radiator grill guard 1 is reduced in weight. In this embodiment, the thickness of each of the plate-like ribs 16 is selected to be twice as large as that of the remaining portion (e.g., the outer wall) of the guard main body 2. However, the use of the ribs does not lead to an excessive increase of the weight of the radiator grill guard 1 because the ribs are only parts of the guard main body. Thus, the use of the thick ribs 16 is especially important in improving the rigidity of the radiator grill guard 1.

(c) The ribs t6 are formed in the blow molding process that is used for forming the guard main body 2. Therefore, any additional complicated rib forming process is not required. In this respect, forming of the radiator grill guard is improved.

(d) Further, when the guard main body 2 is reinforced with the ribs 16, there is no need of using another reinforcing plate. Therefore, the guard main body 2 can be reinforced without increasing manufacturing costs.

The present invention may also be embodied in the following ways.

(1) The ribs 16 may take any form so long as the ribs 16 traverse the inner space of the hollowed guard main body 2.

One of the grills, which are disposed on both sides of each body mounting part 4 and the fog-lamp mounting part 8 in the radiator grill guard 1 shown in FIG. 3, may be omitted only the Outer ribs may be used in the radiator grill guard 1.

Figure 7:
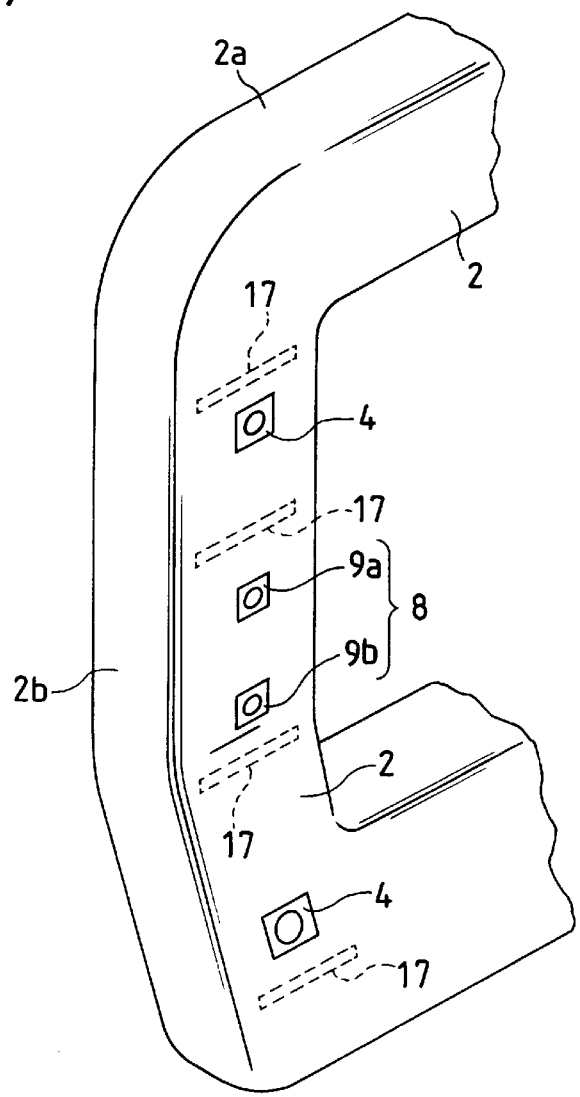
FIG. 7 is a perspective view, partially broken, showing a radiator grill guard according to another embodiment of the invention.

A plural number at ribs 17, which extend horizontally, may be provided in the vertical sections 2b of the guard main body 2, as shown in FIG. 7. In this case, the horizontally extending ribs are each disposed adjacent to the upper side or the lower side of each of the body mounting parts 4 and the fog-lamp mounting parts 8.

Figure 8:
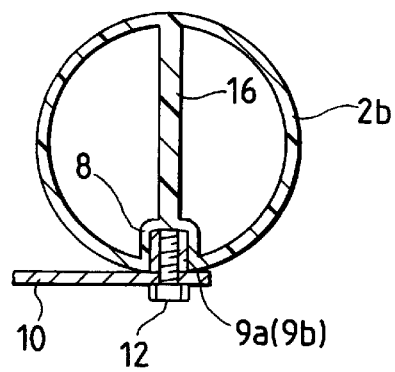
FIG. 8 is a cross sectional view, of a hollowed guard main body of a radiator grill guard according to still another embodiment of the invention.

The inner space of the hollowed guard main body may be shaped to be circular in cross section as shown in FIG. 8. Each rib is disposed passing through the center of the cross section of the inner space.

(2) In the above-mentioned embodiment, the body mounting parts 4 and the fog-lamp mounting parts 8 are provided on the vertical sections 2b of the guard main body 2. Either of the body mounting parts 4 and the fog-lamp mounting parts 8 may be provided on the horizontal sections 2a of the guard main body 2. In this case, the ribs, acting as reinforcing plates, are provided in such a fashion that those traverse the cross section of the inner space.

(3) In the above-mentioned embodiment, the radiator grill guard having the fog lamps mounted thereon is discussed. The present invention is also applicable to a radiator grill guard that does not have or support fog lamps, as a matter of course. In this case, the radiator grill guard is substantially free from the deformation caused by the load of the fog lamps. The ribs, if used, will contribute to increase of the rigidity of the radiator grill guard per se.

The technical idea, which may be seen from the embodiment description, will be described hereunder, together with the useful effects of the technical idea.

(a) In the radiator grill guard for a vehicle, the fog lamps may be provided on the vertically extending sections of the main body the vertically extending sections 2b of the guard main body 2, and ribs are provided in the vertically extending sections of the main body. With this construction, a large stress is produced in the vertically extending sections of the main body, the vertical sections 2b of the guard main body 2, by the load of the fog lamps. However, the ribs prevent those sections from being deformed by such stresses. Provision of the ribs further improves the rigidity of the radiator grill guard per se.

(b) The ribs may be thicker than the outer wall of the main body. With this, the rigidity of the radiator grill guard per se can be improved in a manner that the thickness of the ribs is increased while the surface or outer wall of the radiator grill guard remains thin.

What is claimed is:

1. A radiator grill guard adapted to be mounted to a vehicle comprising:

a hollowed main body formed by blow molding resin material, wherein a cross section of said main body is circular; and a plate-like rib integrally molded with said main body within an inner space of said hollowed main body;

wherein said plate-like rib is located adjacent a body mounting part of said hollowed main body while traversing said inner space and passing through a center of said main body, and said radiator grill guard adapted to be mounted on a body of a vehicle via said body mounting part.

2. The radiator grill guard of claim 1, wherein said main body has a vertically extending section including said mounting part, and said plate-like rib is located to extend vertically within said vertically extending section.

3. The radiator grill guard of claim 2, wherein a plurality of said plate-like ribs are provided within said vertically extending section.

4. The radiator grill guard of claim 1, wherein said hollowed main body has a vertically extending section including said mounting part, and said plate-like rib is located to extend horizontally within said vertically extending section.

5. The radiator grill guard of claim 1, wherein a thickness of said plate-like rib is larger than a thickness of an outer wall of said main body.

6. The radiator grill guard of claim 5, wherein the thickness of said plate-like rib is twice as large as the thickness of said outer wall of said main body.

7. The radiator grill of claim 1, further comprising a device mounting part adjacent said plate-like rib and adapted for mounting a device.

8. A radiator grill guard adapted to be mounted on a vehicle comprising:

a hollowed main body formed by blow molding resin material, wherein a cross section of said main body is circular and said hollowed main body has a vertically extending section which includes a fog-lamp mounting part; and a plate-like rib integrally molded with said hollowed main body within an inner space of said main body which extends vertically within said vertically extending section;

wherein said plate-like rib is located adjacent said fog-lamp mounting part, said fog-lamp mounting part adapted for mounting a fog lamp thereon, said plate-like rib traversing said inner space and passing through a center of said main body.

9. The radiator grill of claim 8, further comprising a fog-lamp mounted to said main body by said fog-lamp mounting part.

10. The radiator grill guard of claim 8, wherein a plurality of said plate-like rib are provided within said vertically extending section.

11. The radiator grill guard of claim 8, wherein said hollowed main body has a vertically extending section including said fog-lamp mounting part, and said plate-like rib is located and extends horizontally within said vertically extending section.

12. The radiator grill guard of claim 8, wherein a thickness of said plate-like rib is larger than a thickness of an outer wall of said main body.

13. The radiator grill guard of claim 12, wherein the thickness of said plate-like rib is twice as large as the thickness of said outer wall of said main body.

14. A radiator grill guard adapted to be mounted on a vehicle comprising:

a hollowed molded main body formed from resin material, wherein a cross section of said main body is circular; and a plate-like rib integrally molded with said hollowed main body within an inner space thereof;

wherein said plate-like rib is located adjacent a device mounting part, said device mounting part adapted for mounting a device thereon, said plate-like rib traversing said inner space and passing through a center of said main body.

* * * * *